(12) United States Patent
Savage et al.

(10) Patent No.: US 10,753,151 B2
(45) Date of Patent: Aug. 25, 2020

(54) BEARINGS FOR DOWNHOLE DRILLING MOTORS

(71) Applicant: Halliburton Energy Services, Inc., Houston, TX (US)

(72) Inventors: John Keith Savage, Edmonton (CA); Steven Graham Bell, Edmonton (CA); Brandon David Jullion, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/307,356

(22) PCT Filed: Jun. 16, 2017

(86) PCT No.: PCT/US2017/037992
§ 371 (c)(1),
(2) Date: Dec. 5, 2018

(87) PCT Pub. No.: WO2018/013292
PCT Pub. Date: Jan. 18, 2018

(65) Prior Publication Data
US 2019/0136628 A1 May 9, 2019

Related U.S. Application Data

(60) Provisional application No. 62/361,132, filed on Jul. 12, 2016.

(51) Int. Cl.
*F16C 17/02* (2006.01)
*F16C 33/04* (2006.01)
(Continued)

(52) U.S. Cl.
CPC ............ *E21B 4/003* (2013.01); *E21B 4/00* (2013.01); *E21B 7/068* (2013.01); *F16C 17/02* (2013.01);
(Continued)

(58) Field of Classification Search
CPC ...... F16C 17/02; F16C 23/048; F16C 33/043; F16C 43/02; F16C 2206/04;
(Continued)

(56) References Cited

U.S. PATENT DOCUMENTS 3,718,379 A * 2/1973 Williams et al. ....... F16C 17/02
384/113
3,887,248 A * 6/1975 Riegler .................. C21C 5/464
384/206
(Continued)

FOREIGN PATENT DOCUMENTS

JP 08312648 11/1996

OTHER PUBLICATIONS

International Search Report and Written Opinion for PCT/US2017/037992 dated Jun. 16, 2017.

*Primary Examiner* — Marcus Charles
(74) *Attorney, Agent, or Firm* — Jason Sedano; C. Tumey Law Group PLLC

(57) ABSTRACT

A bearing assembly for a downhole drilling motor can include a housing having an inner wall, an outer bearing race within the housing, and an inner bearing race. The outer bearing race can include a reduced-diameter portion forming a gap between the outer bearing race and the inner wall of the housing to allow for radial displacement of the outer bearing race relative to the housing. The design combines the functions of a bearing and a compliant feature into a single unit.

19 Claims, 6 Drawing Sheets

(51) Int. Cl.
*E21B 4/00* (2006.01)
*E21B 7/06* (2006.01)
*E21B 4/02* (2006.01)

(52) U.S. Cl.
CPC .............. *F16C 33/043* (2013.01); *E21B 4/02* (2013.01); *F16C 2206/04* (2013.01); *F16C 2352/00* (2013.01)

(58) Field of Classification Search
CPC .. F16C 2352/00; F16C 2226/76; E21B 4/003; E21B 4/02; E21B 7/068; E21B 10/54; Y10T 29/49647
USPC ... 384/95, 97, 117, 285, 306, 309, 312, 913; 175/337, 371, 426; 29/898.042
See application file for complete search history.

(56) References Cited

U.S. PATENT DOCUMENTS

| | | | | |
|---|---|---|---|---|
| 4,732,491 A * | 3/1988 | Geczy | ................... | E21B 4/003 175/320 |
| 4,738,322 A * | 4/1988 | Hall | ................... | E21B 10/20 175/371 |
| 4,995,735 A | 2/1991 | Dansdill | | |
| 5,788,137 A * | 8/1998 | Ku | ................... | F16C 13/006 226/194 |
| 6,481,407 B1 * | 11/2002 | Kammeraad | ................... | B23P 6/00 123/188.9 |
| 8,613,554 B2 | 12/2013 | Tessier et al. | | |
| 8,967,871 B2 * | 3/2015 | Peterson | ................... | F16C 17/06 384/306 |
| 9,353,788 B1 | 6/2016 | Tullett et al. | | |
| 9,394,942 B2 * | 7/2016 | Peterson | ................... | F16C 17/02 |
| 9,562,562 B2 * | 2/2017 | Peterson | ................... | F16C 17/02 |
| 9,732,791 B1 * | 8/2017 | Gonzalez | ................... | F16C 17/06 |
| 2007/0046119 A1 | 3/2007 | Cooley | | |
| 2007/0046120 A1 | 3/2007 | Cooley et al. | | |
| 2009/0103840 A1 * | 4/2009 | Hibi | ................... | F16C 33/20 384/100 |
| 2012/0039551 A1 * | 2/2012 | Cooley | ................... | F16C 17/02 384/26 |
| 2012/0085585 A1 * | 4/2012 | Scott | ................... | B22D 19/14 175/428 |
| 2012/0281938 A1 | 11/2012 | Peterson et al. | | |
| 2013/0004106 A1 * | 1/2013 | Wenzel | ................... | F16C 17/10 384/428 |
| 2014/0376844 A1 | 12/2014 | Swanson et al. | | |

* cited by examiner

BEARINGS FOR DOWNHOLE DRILLING MOTORS

CROSS-REFERENCE TO RELATED APPLICATIONS

This application claims the benefit of U.S. Provisional Application No. 62/361,132, entitled "BEARINGS FOR DOWNHOLE DRILLING MOTORS," filed Jul. 12, 2016, the entirety of each of which is incorporated herein by reference.

TECHNICAL FIELD

The present description relates in general to downhole tools, and more particularly to, for example, without limitation, bearings for downhole drilling motors.

BACKGROUND OF THE DISCLOSURE

Downhole drilling motors (also referred to as "mud motors") are commonly used in the oil and gas industry in drilling wellbores for the extraction of hydrocarbons from subterranean regions. A typical downhole drilling motor includes a motor suspended near the lower end of a string of drill pipe supported from a well surface location, such as a land-based or sea-based drilling rig. The motor includes a rotatable driveshaft that is directly or indirectly coupled to a rotary drill bit, such as a fixed cutter drill bit, a roller cone drill bit, a reamer, etc. The motor operates by circulating drilling fluid or "mud" through the drill pipe and into the motor, which generates torque that causes the driveshaft to rotate and thereby correspondingly rotate the drill bit.

Drilling motors typically include bearing assemblies that help facilitate rotation of the driveshaft during operation. Most bearing assemblies in drilling motors include thrust bearings that assume axial loading and radial bearings that assume radial loading. The thrust and radial bearings each include bearing surfaces that at least partially contact and move or slide relative to opposing bearing surfaces to maintain smooth rotation and operation of the drilling motor. Such bearing surfaces may comprise ultra-hard (super hard) materials for resisting wear during prolonged use. Geometry and configuration of the bearing assemblies are an important factor influencing the performance and life of drilling motors.

DETAILED DESCRIPTION

The present disclosure is related to downhole drilling motors and, more particularly, to bearing assemblies used in downhole drilling motors.

Downhole drilling motors are used to rotate a drill bit to create wellbores used in the extraction of hydrocarbons from subterranean formations. The resulting wellbores commonly include curves, which require the downhole drilling motor to flex and bend while following the wellbore curves. This necessarily bends the housing and driveshaft for a drilling motor, which makes alignment of bearing assemblies that support the driveshaft challenging. This is particularly the case with bearing assemblies whose interfaces generally carry all the loads between stationary and rotating parts where relative rotational motion occurs. Radial bearings can mitigate some of the effect by having short bearing sections separated by a space, but radial bearings must deal with the problem across their interface surfaces or otherwise align themselves to distribute the loading across the interface.

In short, bit-to-bend applications, the radial loads in tight radius curvature applications can become extremely high and cannot be sustained by existing bearing assembly technology. Polycrystalline diamond compact (PDC) bearing assemblies, for example, allow higher loads to be sustained but are susceptible to misalignment from the cantilever loading from the drill bit because of the rigidity of the diamond. The present disclosure provides a radial bearing configuration for bearing assemblies that can provide alignment and balanced loading sufficient to increase the service life of the bearing assembly in the presence of externally driven misalignment. The bearing assemblies disclosed herein integrate existing machined spring and bearing technologies. In some applications, PDC bearing technology is used, although the principles of the present disclosure may be extended into any style radial bearing, including carbide tile bearing assemblies.

Figure 1:
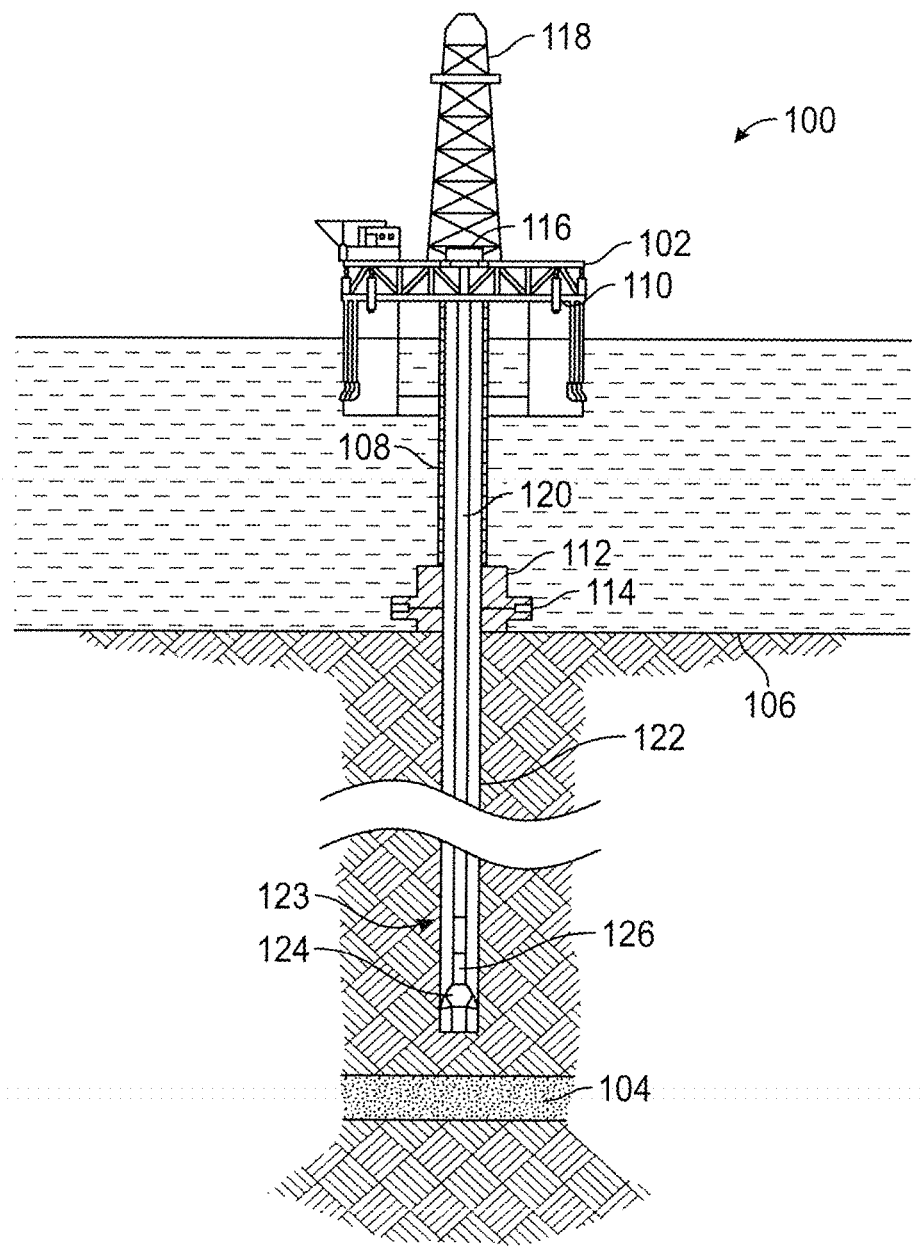
FIG. 1 depicts an example well system that may employ the principles of the present disclosure.

FIG. 1 depicts an example well system 100 that may employ the principles of the present disclosure, according to one or more embodiments. As illustrated, the well system 100 includes an offshore, semi-submersible oil and gas production platform 102 centered over a submerged oil and gas formation 104 located below a sea floor 106. A subsea conduit or riser 108 extends from a deck 110 of the platform 102 to a wellhead installation 112 that may include one or more blowout preventers 114. The platform 102 has a hoisting apparatus 116 and a derrick 118 for raising and lowering tubular lengths of drill pipe, such as a drill string 120. It is noted that even though FIG. 1 depicts an offshore operation, the principles of the present disclosure are equally well suited for use in onshore or "land-based" drilling operations or applications.

A wellbore 122 extends through the various earth strata toward the subterranean hydrocarbon bearing formation 104 and the drill string 120 is extended within the wellbore 122. At its distal end, the drill string 120 includes a bottom hole assembly (BHA) 123 that includes a drill bit 124 and a downhole drilling motor 126, alternately referred to as a "mud motor." Drilling fluid or "mud" is pumped through an interior fluid passageway of the drill string 120 to the downhole drilling motor 126, which converts the hydraulic energy of the circulating fluid to mechanical energy in the form of a rotating rotor or driveshaft included in the downhole drilling motor 126. The driveshaft is operatively coupled (directly or indirectly) to the drill bit 124 to cause rotation of the drill bit 124, and thereby allows the wellbore 122 to be extended.

Even though FIG. 1 depicts a vertical wellbore 122 being drilled, the downhole drilling motor 126 is equally well suited for use in horizontal, slanted, or deviated wellbores. Moreover, use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 2A:
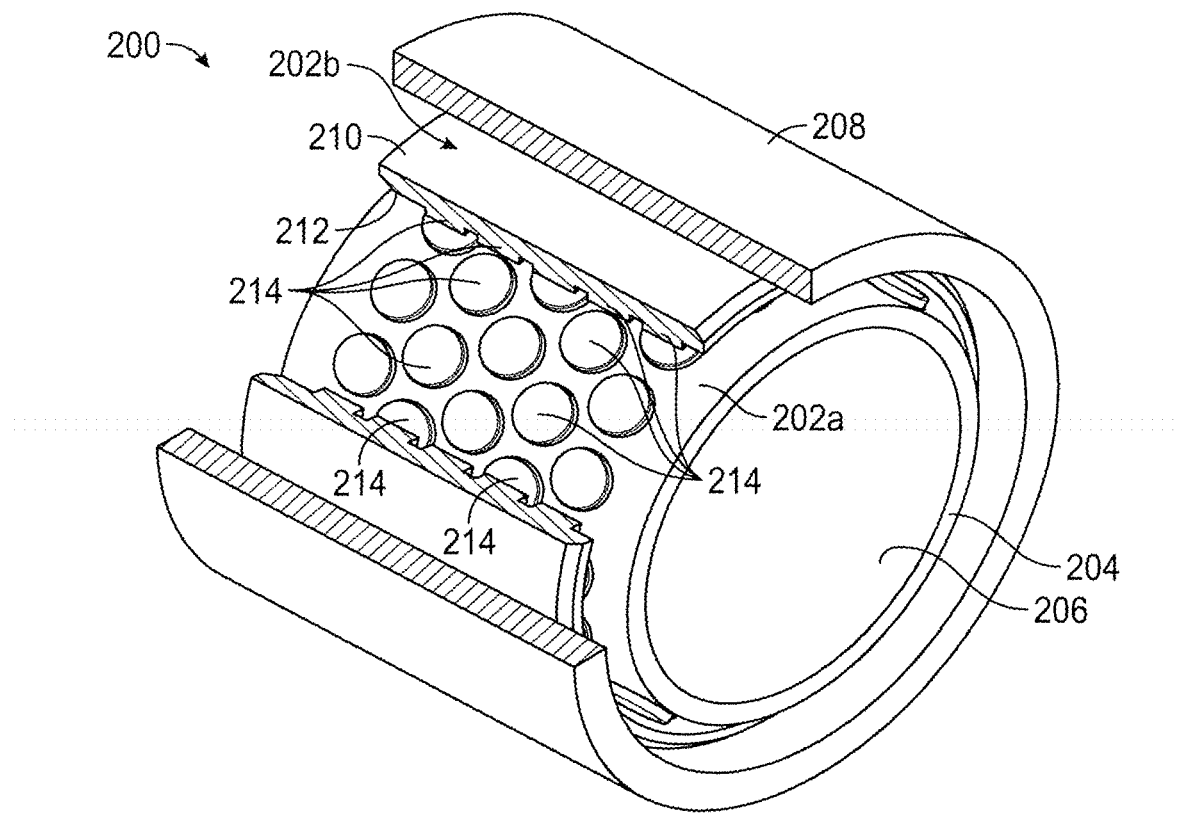
FIGS. 2A and 2B are partial isometric and cross-sectional side views, respectively, of a bearing assembly.
Figure 2B:
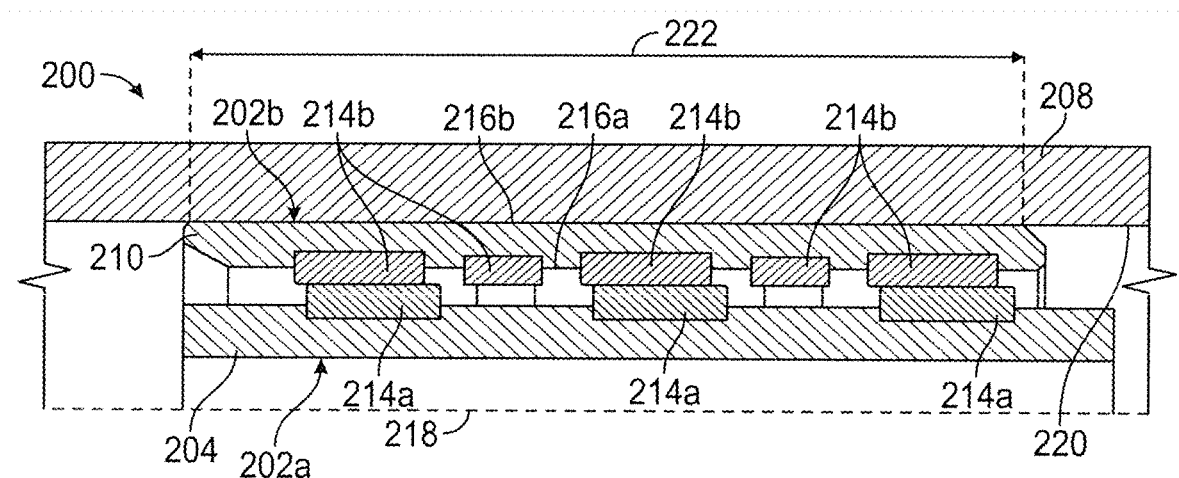

FIGS. 2A and 2B depict a bearing assembly 200. More specifically, FIG. 2A is a partial isometric view of the bearing assembly 200, and FIG. 2B is a cross-sectional side view of the bearing assembly 200. The bearing assembly 200 may be used in conjunction with the downhole drilling motor 126 of FIG. 1.

In FIG. 2A, select portions of the bearing assembly 200 are removed (cut away) to enable viewing internal components. As illustrated, the bearing assembly 200 includes an inner bearing race 202a and an outer bearing race 202b, where the inner bearing race 202a is concentrically located within the outer bearing race 202b. The inner bearing race 202a is configured for rotation relative to the outer bearing race 202b. The inner bearing race 202a, for example, may be secured to a rotating member (rotor) of the downhole drilling motor 126 (FIG. 1), such as a driveshaft. The inner bearing race 202a comprises a generally cylindrical body 204 that defines a central bore 206 configured to receive the driveshaft to enable the inner bearing race 202a to be fixed (e.g., supported, attached, fastened, etc.) to the outer surface of the driveshaft for co-rotation therewith during operation.

The outer bearing race 202b is coupled to a housing 208, which may comprise a stationary portion of the downhole drilling motor 126 (FIG. 1). The outer bearing race 202b may be coupled to the housing 208 via a shrink fit or with one or more mechanical fasteners. The housing 208 comprises a stator, which allows the outer bearing race 202b to remain stationary relative to the inner bearing race 202a during operation. Similar to the inner bearing race 202a, the outer bearing race 202b comprises a generally cylindrical body 210 that defines a central bore 212. The central bore 212 is sized to receive the inner bearing race 202a in a nested, concentric relationship that allows relative movement.

The inner and outer bearing races 202a,b may each include a plurality of bearing inserts 214. Each bearing insert 214 may comprise a generally cylindrical disk or "puck" secured to the corresponding bodies 204, 210. More specifically, a plurality of bearing inserts 214 may be coupled to the outer circumference of the body 204 of the inner bearing race 202a, and a corresponding plurality of bearing inserts 214 may be coupled to the inner circumference of the body 210 of the outer bearing race 202b. The radially opposing bearing inserts 214 are configured to bear against each other during operation as the inner bearing race 202a rotates relative to the outer bearing race 202b. While the bearing inserts 214 are shown and described herein as cylindrical disk or puck-shaped structures, it is also contemplated herein to replace the bearing inserts with a coating, such as traditional continuous tungsten carbide fused, or alternatively with a tiled solution.

The bearing surface of each bearing insert 214 may be made of a variety of ultra-hard materials including, but not limited to, polycrystalline diamond (PCD), thermally stable polycrystalline diamond (TSP), cubic boron nitride, impregnated diamond, nanocrystalline diamond, ultra-nanocrystalline diamond, and zirconia. Such materials are extremely wear resistant and are suitable for use as bearing surfaces, as herein described.

Alternatively, or in addition thereto, some or all of the bearing inserts 214 may comprise a polycrystalline diamond compact (PDC). PDCs are normally fabricated by placing a cemented carbide substrate (e.g., tungsten carbide) into an ultra-high pressure press with a layer of diamond crystals or grains positioned on one surface of the substrate. The substrate and adjacent diamond crystal layers are then sintered under ultra-high temperature and ultra-high pressure ("HTHP") conditions, which cause the diamond crystals or grains to bond to one another and form polycrystalline diamond. In some cases, a catalyst (e.g., cobalt, nickel, and iron) may be used to facilitate the formation of the polycrystalline diamond. During the sintering process, the catalyst liquefies and helps form a bond between the diamond grains. The catalyst may subsequently be removed by leaching (i.e., exposing at least a portion of the diamond table to an acid) or by any suitable method.

In FIG. 2B, the bearing inserts coupled to the inner bearing race 202a are depicted as inner bearing inserts 214a, and the bearing inserts coupled to outer bearing race 202b are depicted as outer bearing inserts 214b. The bearing inserts 214a,b can be secured to the corresponding bodies 204, 210 via a variety of attachment means including, but not limited to, brazing, welding, an adhesive, shrink fitting, press fitting, a mechanical fastener (e.g., snap rings, set screws, etc.), or any combination thereof. As illustrated, the bearing assembly 200 is configured such that radially opposing inner and outer bearing inserts 214a, b come into radial sliding engagement with one another during operation.

The body 210 of the outer bearing race 202b provides an inner circumferential surface 216a and an outer circumferential surface 216b. While shown in FIG. 2A as exhibiting a generally circular cross-section, the outer circumferential surface 216b could alternatively exhibit a polygonal cross-sectional shape, such as being hexagonal. In the illustrated embodiment, the outer bearing inserts 214b are secured to the inner circumferential surface 216a and the outer circumferential surface 216b extends parallel to a longitudinal axis 218 of the bearing assembly 200 and engages an inner wall 220 of the housing 208 along an axial length 222 of the body 210. As illustrated, the axial length 222 encompasses each of the outer bearing inserts 214b such that each outer bearing insert 214b is radially offset from a portion of the outer circumferential surface 216b that radially engages the inner wall 220.

Figure 3A:
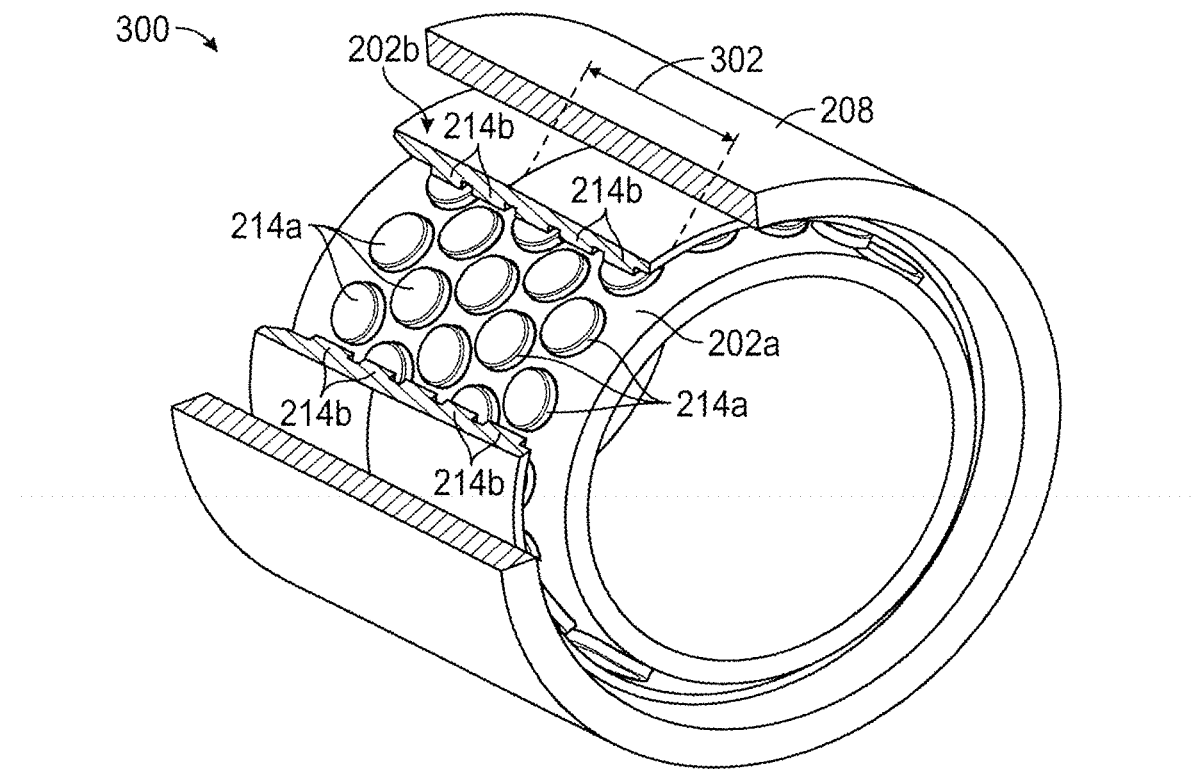
FIGS. 3A and 3B are partial isometric and cross-sectional side views, respectively, of an example bearing assembly.
Figure 3B:
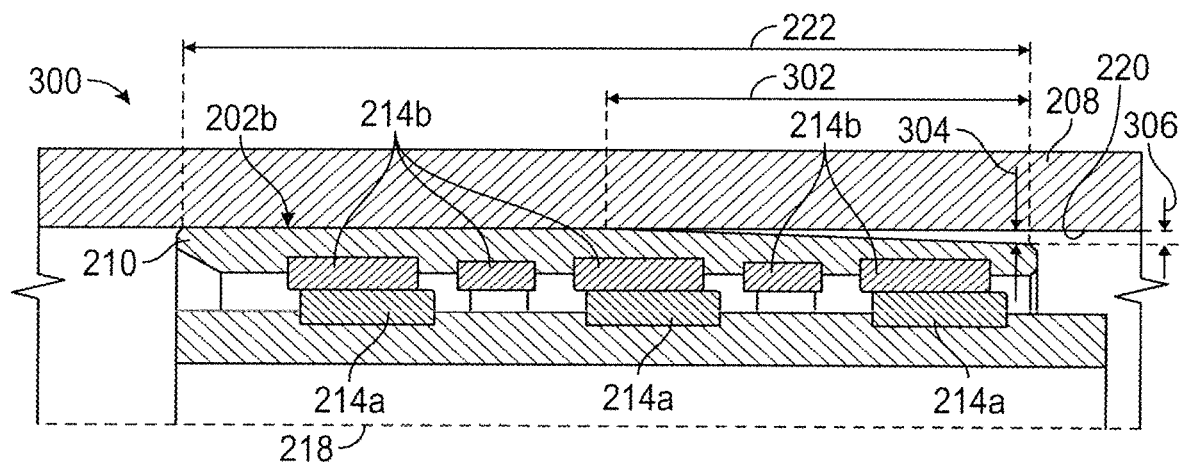

FIGS. 3A and 3B are partial isometric and cross-sectional side views, respectively, of an example bearing assembly 300, according to one or more embodiments of the present disclosure. The bearing assembly 300 may be similar in some respects to the bearing assembly 200 of FIGS. 2A-2B and therefore may be best understood with reference thereto, where like numerals will represent like elements not described again in detail. Similar to the bearing assembly 200 of FIGS. 2A-2B, for example, the bearing assembly 300 may be used in conjunction with the downhole drilling motor 126 of FIG. 1 and includes the inner bearing race 202a concentrically located within the outer bearing race 202b. The inner bearing race 202a is configured for rotation relative to the outer bearing race 202b, while the outer bearing race 202b is coupled to the housing 208. Moreover, each of the inner and outer bearing races 202a, b has the bearing inserts 214a, b coupled thereto, as generally described above.

In FIG. 3B, however, unlike the bearing assembly 200 of FIGS. 2A-2B, a reduced-diameter portion 302 may be defined and otherwise provided along the axial length 222 of the outer circumferential surface 216b of the outer bearing race 202*b*. More specifically, the body 210 may define or provide the reduced-diameter portion 302, which generally comprises a portion of the body 210 having a reduced thickness or geometry where the outer circumferential surface 216*b* does not engage the inner wall 220 of the housing 208. Consequently, a gap 304 is formed between the outer bearing race 202*b* and the inner wall 220 along the reduced-diameter portion 302, which allows for radial displacement of the outer bearing race 202*b* during operation. In one or more embodiments, the reduced-diameter portion 302 is provided on a downhole end (i.e., to the right in FIGS. 3A-3B) of the bearing assembly 300. In other embodiments, however, the reduced-diameter portion 302 may be alternatively provided on an uphole end (i.e., to the left in FIGS. 3A-3B) of the bearing assembly 300, without departing from the scope of the disclosure.

In some embodiments, the reduced-diameter portion 302 may extend generally parallel with the longitudinal axis 218 (or the inner wall 220) of the bearing assembly 300. In other embodiments, however, and as is depicted in FIG. 3B, the reduced-diameter portion 302 may taper and otherwise extend at an angle 306 relative to the inner wall 220 of the housing 208. The length of the reduced-diameter portion 302 may depend on the base material of body 210 of the outer bearing race 202*b* and the amount of travel (i.e., radial displacement) required. The body 210 may be made of, for example, a variety of steels or titanium alloys. The length of the reduced-diameter portion 302 and the angle 306 of the taper (if tapered) can be optimized to maintain stresses below a threshold and bottom before doing damage.

As will be appreciated, the gap 304 may prove advantageous in allowing the bearing assembly 300 to flex to accommodate for cantilever bending or radial displacement of a driveshaft of the downhole drilling motor 126 (FIG. 1). As the driveshaft bends during operation, the inner bearing race 202*a* supported by the driveshaft will act on the outer bearing race 202*b* via the opposing bearing inserts 214*a, b*. The gap 304 provides an amount of give (radial slack) in the bearing assembly 300, which helps prevent misalignment of the bearing inserts 214*a, b* or excessive radial loads sustained by the bearing inserts 214*a, b* that would otherwise shorten the life span of the bearing assembly 300. More specifically, the gap 304 helps increase the contact area of the bearing inserts 214*a, b* that is actively sharing the load (i.e., sometimes referred to as the "contact patch"). Increasing the contact area reduces the amount of heat generated in the bearing, the amount of wear experienced on any one surface, and the load carried by any individual bearing insert 214*a,b*.

While the reduced-diameter portion 302 has been described herein as being formed on the outer circumferential surface 216*b* of the outer bearing race 202*b*, it is also contemplated herein to alternatively form the reduced-diameter portion 302 on the inner wall 220 of the housing 208. This may prove advantageous in maintaining the diameter of the outer bearing race 202*b* substantially parallel to the bearing shell outside diameter parallel to the longitudinal axis 218 of the bearing assembly 300. Moreover, while the reduced-diameter portion 302 is depicted in FIGS. 3A-3B as being a symmetrical feature that extends about the longitudinal axis 218, the reduced-diameter portion 302 may alternatively extend asymmetrically (e.g., undulating, etc.) on either the outer circumferential surface 216*b* of the outer bearing race 202*b* or the inner wall 220 of the housing 208.

In some embodiments, the gap 304 formed by the reduced-diameter portion 302 may be filled with a compliant material, such as rubber or an elastomer. In such cases, the gap 304 may be filled partially or wholly with the compliant material.

Figure 4A:
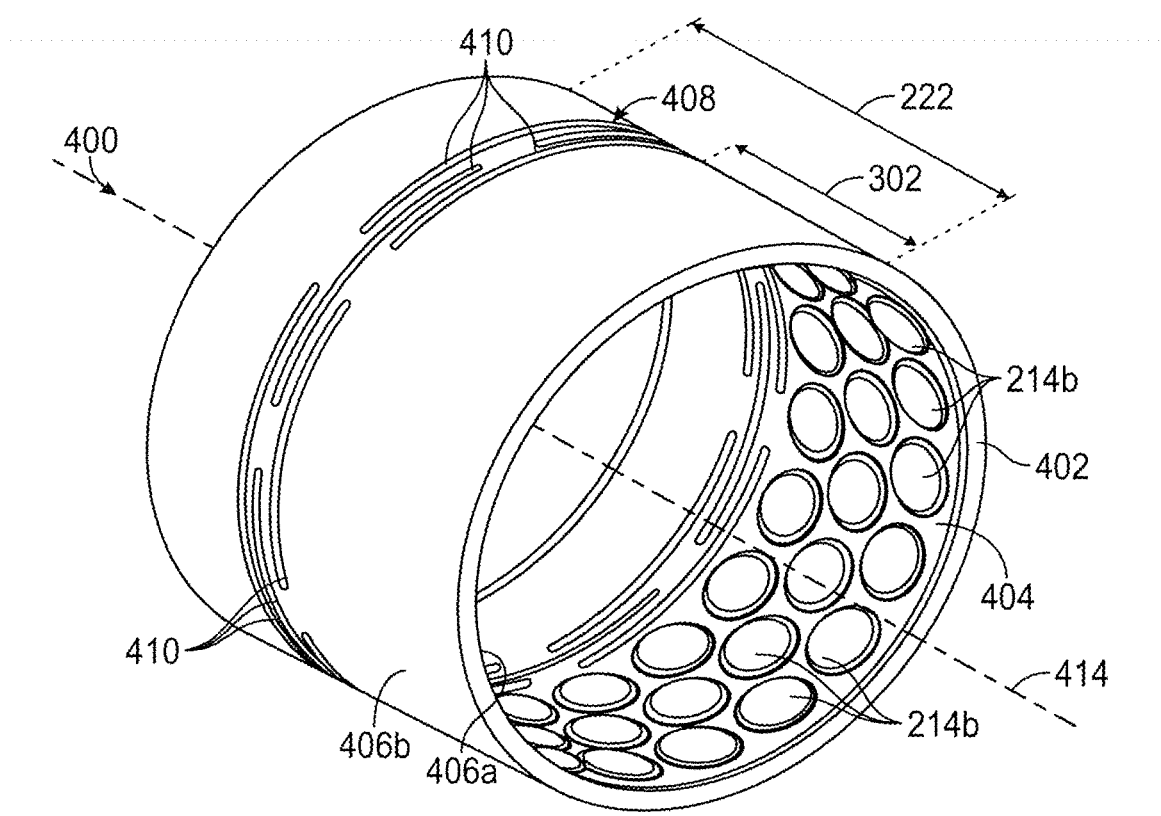
FIGS. 4A and 4B are isometric and cross-sectional side views, respectively, of an example outer bearing race.
Figure 4B:
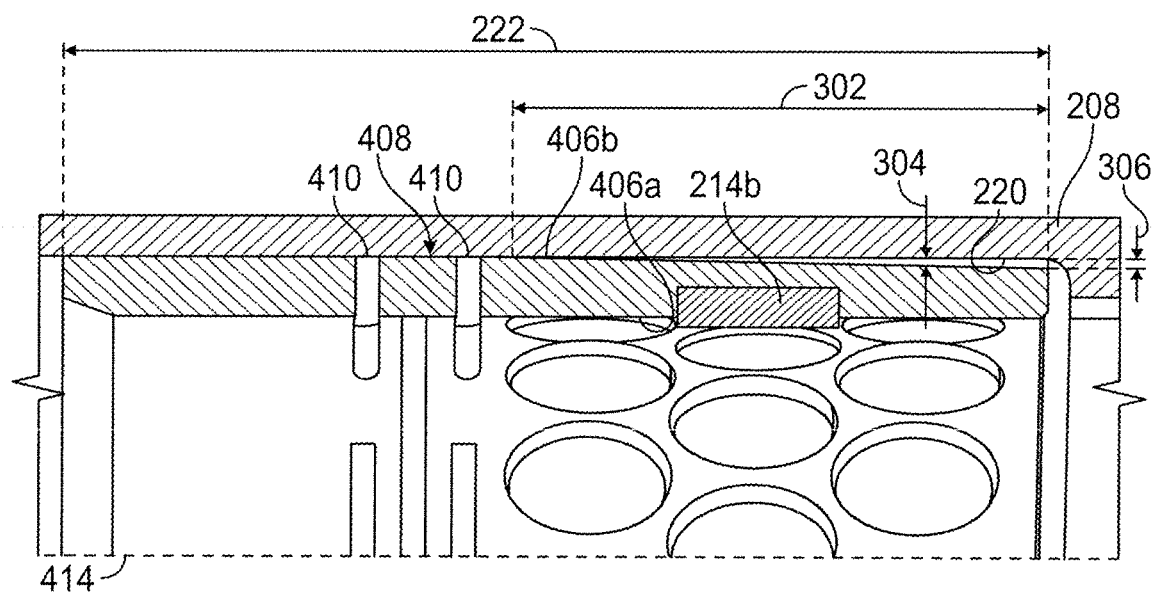

FIGS. 4A and 4B are isometric and cross-sectional side views, respectively, of an example outer bearing race 400, according to one or more embodiments of the disclosure. The outer bearing race 400 may be similar to the outer bearing race 202*b* of FIGS. 3A-3B and, therefore, may replace the outer bearing race 202*b* and form part of the bearing assembly 300 of FIGS. 3A-3B.

The outer bearing race 400 may comprise a generally cylindrical body 402 that defines a central bore 404 sized to receive the inner bearing race 202*a* (FIG. 2A-2B or 3A-3B) in a nested, concentric relationship, as generally described above. Moreover, the body 402 provides an inner circumferential surface 406*a* and an outer circumferential surface 406*b*, where the plurality of outer bearing elements 214*b* are secured to the inner circumferential surface 406*a*.

Similar to the outer bearing race 202*b* of FIGS. 3A-3B, at least a portion of the outer circumferential surface 406*b* of the outer bearing race 400 engages the inner wall 220 (FIG. 4B) of the housing 208 (FIG. 4B) along the axial length 222. Moreover, the body 210 defines and otherwise provides the reduced-diameter portion 302. Consequently, as shown in FIG. 4B, the gap 304 is formed between the outer circumferential surface 406*b* and the inner wall 220 of the housing 208. In the illustrated embodiment, the reduced-diameter portion 302 tapers and otherwise extends at the angle 306 relative to the inner wall 220.

Unlike the outer bearing race 202*b* of FIG. 2A-2B or 3A-3B, however, the outer bearing race 400 may include and otherwise define a compliant feature 408 that allows the outer bearing race 400 to flex during operation. More particularly, a plurality of slots 410 may be defined through the body 402 and extend about the circumference of the body 402 substantially perpendicular to a longitudinal axis 414 of the outer bearing race 400. The longitudinal axis 414 may be co-axial with the longitudinal axis 218 of the bearing assembly 300 of FIGS. 3A-3B, and the slots 410 each extend between the inner and outer circumferential surfaces 406*a, b* of the body.

In the illustrated embodiment, the compliant feature 408 is provided on the body 402 along the portion of the body 402 that will be coupled to the inner wall 220 of the housing 208. The slots 410 effectively decrease the structural rigidity of the body 402 at that location and thereby allow the body 402 to flex to accommodate misalignment of the outer bearing inserts 214*b* with the inner bearing inserts 214*a* (FIG. 3B). As discussed above, misalignment of the inner and outer bearing inserts 214*a,b* can result from cantilever loads resulting from operation of a drill bit (e.g., the drill bit 124 of FIG. 1) operatively coupled to a driveshaft that supports the inner bearing race 202*a* (FIGS. 3A-3B). As further explanation, cantilever loading will normally cause the axis of the driveshaft to be offset from the axis of the housing 208, which misalign the bearing inserts 214*a, b* on their opposing bearing surfaces and instead point load on either the uphole or downhole edge. The compliant feature 408 allows the axis of the outer bearing race 202*b* to tilt to match the axis of the driveshaft under high loads. This allows for a continuous surface contact between the inner and outer bearing inserts 214*a, b* under any loading.

Figure 5A:
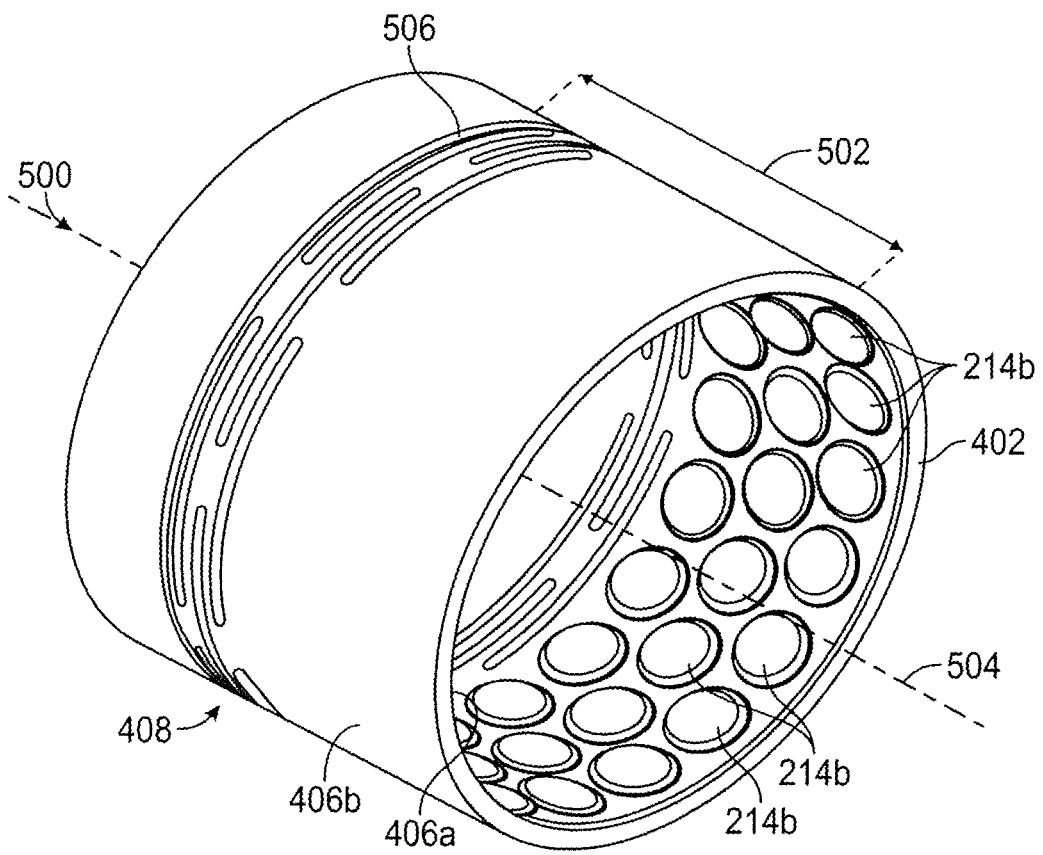
FIGS. 5A and 5B are isometric and cross-sectional side views, respectively, of another example outer bearing race.
Figure 5B:
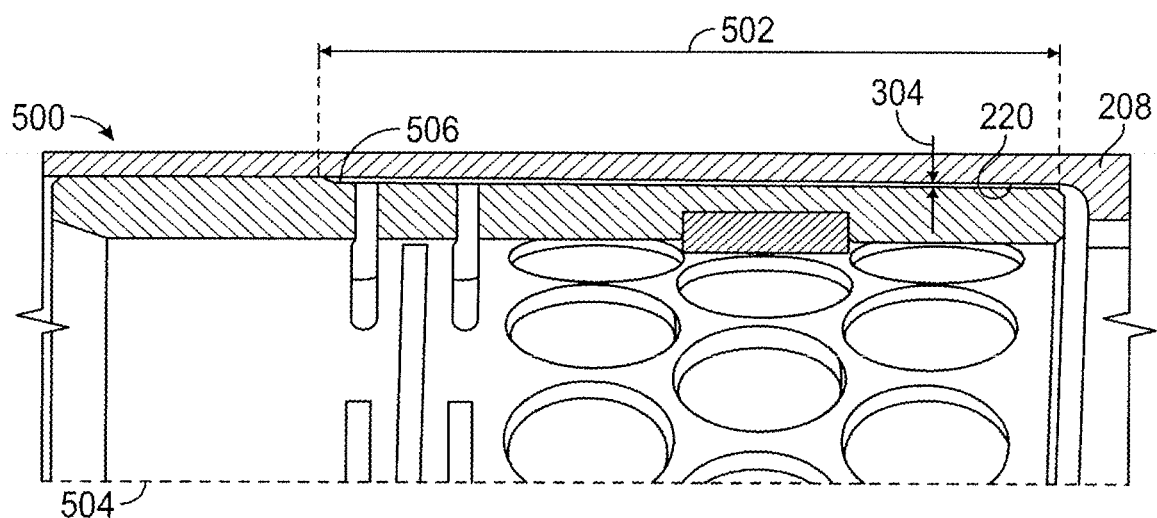

FIGS. 5A and 5B are isometric and cross-sectional side views, respectively, of another example outer bearing race 500, according to one or more embodiments of the disclosure. The outer bearing race 500 may be similar to the outer bearing race 202*b* of FIGS. 3A-3B and, therefore, may replace the outer bearing race 202b and form part of the bearing assembly 300 of FIGS. 3A-3B. Moreover, the outer bearing race 500 may be similar in some respects to the outer bearing race 400 of FIGS. 4A-4B and therefore may be best understood with reference thereto, where like numerals will represent like elements not described again.

Similar to the outer bearing race 400 of FIGS. 4A-4B, for example, the outer bearing race 500 may comprise the body 402 that provides the inner and outer circumferential surfaces 406a, b and the plurality of outer bearing elements 214b secured to the inner circumferential surface 406a. Moreover, the compliant feature 408 may be provided on the body 402 to allow the outer bearing race 500 to flex during operation.

Furthermore, the outer bearing race 500 may define or otherwise provide a reduced-diameter portion 502. In one or more embodiments, the reduced-diameter portion 502 is provided on a downhole end (i.e., to the right in FIGS. 5A-5B) of the bearing assembly, but could alternatively be provided on an uphole end of the bearing assembly, without departing from the scope of the disclosure. Unlike the reduced-diameter portion 302 of the outer bearing race 400 of FIGS. 4A-4B, however, the reduced-diameter portion 502 may extend substantially parallel to a longitudinal axis 504 of the outer bearing race 500 or alternatively parallel to the inner wall 220 (FIG. 5B) of the housing 208 (FIG. 5B). More specifically, the reduced-diameter portion 502 may comprise an undercut surface that extends from a radius or shoulder 506 defined on the outer circumferential surface 406b of the body 402. The gap 304 formed between the outer circumferential surface 406b and the inner wall 220 of the housing 208 allows the outer bearing race 500 to flex during operation as acted upon by a cantilevered driveshaft, as generally described above. This undercut feature allows radial displacement to occur, which again allows for the axis of a driveshaft and the housing 208 to align across the bearing surface, resulting in an even and uniform contact across all rows of bearing inserts 214a,b. The machined compliant feature 408 allows for accurate and detailed control of the rate at which this occurs.

Figure 6A:
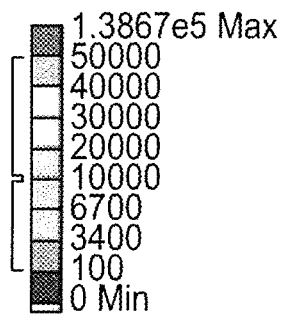
FIGS. 6A and 6B depict finite element analysis models developed to determine the required size and taper of an outer bearing race in accordance with the principles of the present disclosure
Figure 6A:
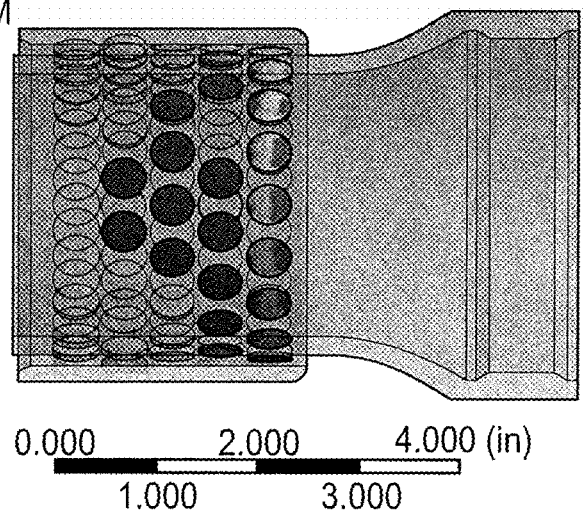
Figure 6B:
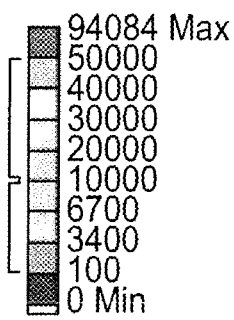
Figure 6B:
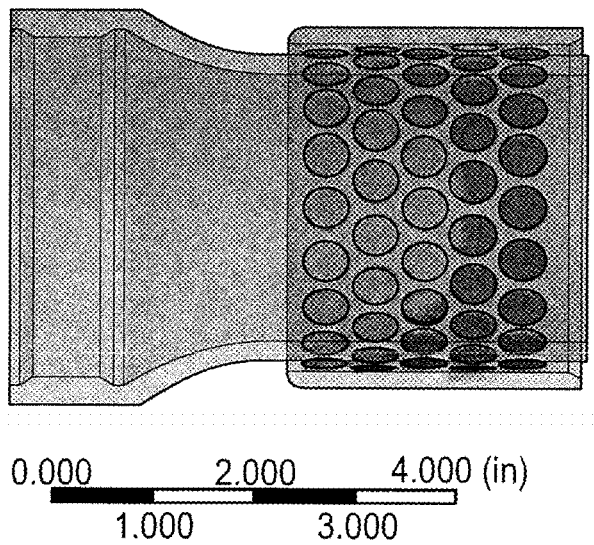

FIGS. 6A and 6B depict finite element analysis (FEA) models developed to determine the required size and taper of an outer bearing race in accordance with the principles of the present disclosure. In FIG. 6A, the FEA image shows a design that does not include a tapered outer bearing race. The FEA shows the stress distribution over the discrete bearing inserts, but only the downhole row (i.e., to the right in FIG. 6A) of bearing inserts shows any significant loading.

In FIG. 6B, the FEA image shows a tapered design for the outer bearing race. As can be see, the loading on the bearing inserts is now spread fairly evenly over the downhole (i.e., to the right in FIG. 6B) three rows of the bearing inserts. This equated to reducing the maximum pressure by 32%, and the nominal pressure value was significantly reduced as well. The maximum pressure could be reduced even further in bearing assembly designs that have room for tapering the inner bearing race.

Accordingly, the bearing assemblies described herein may prove advantageous by lowering the operating costs and increasing the reliability of downhole drilling motors. The design combines the functions of a bearing and a compliant feature into a single unit, hence one part replacing multiple separate parts. The embodiments disclosed herein are anticipated to reduce service turnaround times and reduce assembly complication and errors. It will also allow the reliability of performance in high dogleg, short bit-to-bend applications where radial loads are extreme, and bearings frequently fail.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A bearing assembly for a downhole drilling motor, comprising:
   an outer bearing race having a cylindrical body that defines an inner circumferential surface and an outer circumferential surface;
   an inner bearing race concentrically located within the outer bearing race;
   a plurality of inner bearing inserts coupled to the inner bearing race and plurality of outer bearing inserts coupled to the inner circumferential surface of the cylindrical body to radially oppose the plurality of inner bearing inserts, wherein the inner bearing inserts comprise one of a nanocrystalline diamond, ultra-nanocrystalline diamond, or zirconia; and
   a reduced-diameter portion provided on the outer circumferential surface and forming a gap between the outer bearing race and an inner wall of a housing of the downhole drilling motor.

2. The bearing assembly of claim 1, wherein the reduced-diameter portion extends generally parallel with a longitudinal axis of the bearing assembly.

3. The bearing assembly of claim 1, wherein the reduced-diameter portion tapers at an angle relative to the inner wall of the housing.

4. The bearing assembly of claim 1, further comprising a compliant feature defined by the body that allows the outer bearing race to flex during operation.

5. The bearing assembly of claim 4, wherein the compliant feature comprises a plurality of slots defined through the body and extending about a circumference of the body substantially perpendicular to a longitudinal axis of the outer bearing race.

6. The bearing assembly of claim 4, wherein the compliant feature is provided on the body along a portion of the body coupled to the inner wall of the housing.

7. The bearing assembly of claim 1, wherein the inner bearing race is secured to a driveshaft of the downhole drilling motor for co-rotation therewith during operation.

8. The bearing assembly of claim 1, wherein the outer bearing race is coupled to a housing of the downhole drilling motor.

9. The bearing assembly of claim 1, wherein a bearing surface of the outer bearing inserts comprises an ultra-hard material selected from the group consisting of a nanocrystalline diamond, ultra-nanocrystalline diamond, and zirconia.

10. The bearing assembly of claim 1, wherein one or more of the inner and outer bearing inserts comprises a polycrystalline diamond compact.

11. A downhole drilling motor comprising:
    a housing having an inner wall;
    an outer bearing race having an Inner circumferential surface, an outer circumferential surface, and outer bearing inserts coupled to the inner circumferential surface, wherein the outer circumferential surface comprises a reduced-diameter portion forming a gap between the outer bearing race and the inner wall of the housing; and
    an inner bearing race positioned within the outer bearing race and having inner bearing inserts radially opposite the outer bearing inserts, wherein the inner bearing inserts comprise one of a nanocrystalline diamond, ultra-nanocrystalline diamond, or zirconia.

12. The downhole drilling motor of claim 11, wherein the reduced-diameter portion allows for radial displacement of the outer bearing race relative to the housing.

13. The downhole drilling motor of claim 11, wherein the reduced-diameter portion extends generally parallel with a longitudinal axis of the housing.

14. The downhole drilling motor of claim 11, wherein the reduced-diameter portion tapers at a nonzero angle relative to the inner wall of the housing.

15. The downhole drilling motor of claim 11, further comprising a driveshaft secured to the inner bearing race for co-rotation therewith during operation.

16. A method comprising:
    providing a downhole drilling motor within a wellbore, the downhole drilling motor comprising:
    a housing having an inner wall;
    an outer bearing race having an inner circumferential surface and an outer circumferential surface; and an inner bearing race positioned within the outer bearing race; and rotating an inner bearing race within an outer bearing race by moving inner bearing inserts of the inner bearing race across outer bearing inserts of the outer bearing race, wherein the inner bearing inserts comprise one of a nanocrystalline diamond, ultra-nanocrystalline diamond, or zirconia; and during the rotating, displacing the outer bearing race relative to the housing by adjusting a gap between the outer bearing race and the inner wall of the housing, wherein the gap is formed by a reduced-diameter portion of the outer bearing race.

17. The method of claim 16, wherein the displacing comprises radially displacing the outer bearing race relative to the housing.

18. The method of claim 16, wherein the rotating comprises driving the inner bearing race with a driveshaft of the downhole drilling motor.

19. The method of claim 16, wherein the displacing aligns a driveshaft of the downhole drilling motor with the inner bearing race and the outer bearing race.

* * * * *